United States Patent [19]

Haerle

[11] Patent Number: 4,981,172
[45] Date of Patent: Jan. 1, 1991

[54] MECHANISM FOR HEAT TRANSFER

[75] Inventor: Hans A. Haerle, Bopfingen, Fed. Rep. of Germany

[73] Assignee: Schwaebische Huettenwerke GmbH, Fed. Rep. of Germany

[21] Appl. No.: 395,825

[22] Filed: Aug. 18, 1989

[30] Foreign Application Priority Data

Aug. 20, 1988 [DE] Fed. Rep. of Germany ....... 3828348

[51] Int. Cl.⁵ .............................................. F28F 13/00
[52] U.S. Cl. .................................... 165/133; 126/449; 165/907
[58] Field of Search ................. 126/449; 165/133, 907

[56] References Cited

U.S. PATENT DOCUMENTS

| | | | |
|---|---|---|---|
| 3,161,478 | 12/1964 | Chessin | 165/907 X |
| 3,306,353 | 2/1967 | Burne | 165/907 X |
| 4,064,914 | 12/1977 | Grant | 165/907 X |
| 4,683,872 | 8/1987 | Fricker | 126/449 |

FOREIGN PATENT DOCUMENTS

| | | | |
|---|---|---|---|
| 128842 | 10/1979 | Japan | 126/449 |
| 152241 | 11/1979 | Japan | 126/449 |

Primary Examiner—Robert G. Nilson
Attorney, Agent, or Firm—Welsh & Katz, Ltd.

[57] ABSTRACT

A device for heat transfer or for heat dissipation from an object to a fluid, especially air is disclosed. The device is coated at least in part with shavings, metal wires or coarse metal powder made of thermally conductive material and sintered. The object may also consist fully or at least in part of the sintered materials.

16 Claims, 2 Drawing Sheets

MECHANISM FOR HEAT TRANSFER

BACKGROUND OF THE INVENTION

The subject invention relates to a means or mechanism for heat transfer or for heat dissipation from an object to a fluid, such as air.

Heat transfer or heat dissipation on the basis of temperature differences is used in various ways with this technology. Heat transfer can generally occur in three different ways:

(1) Through heat conduction, whereby heat flows through a solid medium or a stagnant fluid, (2) through convection, whereby heat is transported by movement of a medium, generally a fluid, and (3) through radiation, whereby heat is transferred in the form of electromagnetic waves.

Frequently, several of these elementary types of heat transfer are combined with one another.

Heat exchangers are known in the art, which consist of two or more pipes through which two media flow at different temperatures whereby heat exchange occurs on the basis of parallel flow or countercurrent principles.

With solar power units, directing the focused solar heat from a mirror system to a wire mesh consisting of a cylinder with fine-meshed wires is already known. Air is then fed through the cylinder, whereby temperatures of more than 800° C. can be attained. The energy contained in the hot air can then be utilized in various ways, such as in an absorber with cooling pipes, for example.

While relatively good degrees of efficiency can be achieved with the cylindrical wire mesh, the drawback is that the wire mesh has only limited stability and is difficult to shape as needed. Also known are cooling fins, cooling ridges and the like, located on the outer surface of a container and which provide better dissipation through the increased surface area.

The drawback here, however, is that this makes the object to be cooled significantly heavier and larger.

The present invention is therefore based on the problem of producing a device of the type mentioned, with a high degree of efficiency and also high stability, whereby it should also be largely free of limitations in its form and should not lead to too great an increase in weight or space requirements.

SUMMARY OF THE INVENTION

According to the invention, this problem is resolved by the object being coated at least in part with shavings, metal wires or coarse metal powder made of thermal conductive material which is sintered onto the object, sintered into the object or by the object consisting fully or at least in part of sintered materials.

Depending on the application, the object can be fully or virtually fully molded from metal shavings, metal wires or coarse metal powder and then sintered, or the metal shavings, metal wires or the coarse metal powder are sintered onto at least a part of the surface of the object.

When using the device in accordance with the invention as a heat exchanger in solar power units, the object will be made completely of the specified sintered parts. Air is then fed through the object as a heat transfer medium.

In comparison to wire mesh as set forth above, considerably more stability and more shaping capability exists. By varying the sintering mold shapes, the object can also be produced in any shape required.

In a preferred embodiment of the invention, the object may also be made up of one or more plates formed of a mesh or fabric of metal wires which are partially joined to one another by means of resistance welding. A composite multilayer board-like structure results. An object of this type can be produced very simply and cost effectively. At the same time, and in contrast to known meshes, a compact unit is obtained and a high throughput is guaranteed. Because the metal wires of a mesh or fabric of this type only touch in a few points, and are joined to one another at such points by resistance welding, a multitude of pores or openings remains available for the throughput of a fluid, such as air. The shavings, metal wires or the coarse metal powder are then sintered on to the board-shaped object.

Wires of different thicknesses in the plate or plates may also be used. In this embodiment, either wires of different strengths or thicknesses are used within a plate, or several plates are used one over the other whereby each plate has wires with different strengths or diameters compared to the wires in the other plates. In this way, the throughput rate for the fluid can be controlled using different pore or hole sizes within the device if necessary. With such a structure, a heat transfer device can also be used as a filter to separate out impurities.

Sintered parts are known in technology in most fields. In general, metal powder is hot or cold molded in hydraulic or eccentric presses and then sintered. Sintering is taken to mean heating in a reducing atmosphere to temperatures roughly in the region of $\frac{2}{3}$ to 4/5 of the melting point of the metal powder in question. In so doing, the metal surfaces bake together and the powder mixture solidifies.

It has now become clear that when making a sintered part from small metal wire sections, metal shavings or coarse metal powder, a sufficiently high porosity is obtained to enable the part to be used for heat exchange with a fluid such as air flowing through the part. Any other gaseous medium may also be effective.

In comparison to known wire mesh, the improved bonding of the metal wires and metal shavings or coarse metal powder makes better thermal conductivity possible, thus making better heat dissipation possible. In the case of wire mesh, the heat transfer can only occur through surface contact. Moreover, the object in accordance with the invention is also more stable and can be subjected to higher loads. This also applies if plates made of a mesh or fabric of metal wires are used as the initial product or as an object, as the stability of the plates is increased by the resistance welding.

For this reason, the device according to the invention is particularly suited for use in solar power units. Other areas of application for this invention are those which have quick and good heat dissipation from objects which produce heat or in which heat is produced. This applies in particular to a large degree to vehicle manufacturing, such as for cylinder head covers, oil sumps, gear covers and gearbox casings. Fitting the relevant parts with cooling fins is known. The drawback with that method, however, is that apart from the additional space requirement, the object being cooled also becomes heavier.

In a development according to the invention, it can be anticipated that metal shavings, metal wires or coarse medal powder is sintered onto at least a part of the surface of the object being cooled. This measure results in a significant increase in the surface of the object being cooled, whereby the sintering gives intensive contact with the object itself, with appropriate good heat transfer or heat dissipation.

In comparison to known measures for heat dissipation, such as cooling fins for example, the sintering according to the invention requires significantly less space. The weight of the object is also only increased by an insignificant amount. Another benefit is that sintering according to the invention also provides a noise restricting or anti-drumming effect.

The measure according to the invention can be combined with known measures and devices for heat dissipation if required. For example, metal wires, metal shavings or coarse metal powder may also be sintered onto cooling fins.

Two examples of the invention are described in principle below, on the basis of the drawings.

DETAILED DESCRIPTION OF THE INVENTION

Figure 1:
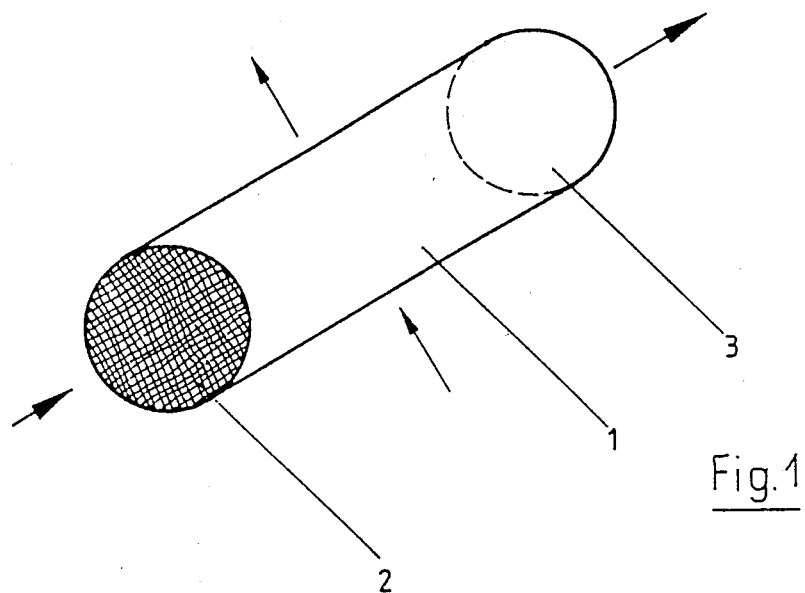
FIG. 1 is a perspective view of a device for heat exchange in solar power units utilizing the subject invention.
Figure 2:
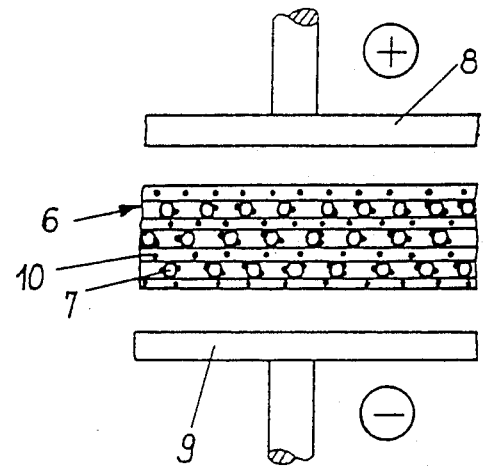
FIG. 2 shows a device for heat exchange in solar power units with a board-shaped object made of a mesh of metal wires.

Object 1 shown in FIGS. 1 and 2 is particularly suited for use with solar power units.

According to the example shown in FIG. 1, it consists entirely of metal shavings molded to the required form and then sintered. This gives an object with high porosity.

In terms of materials, any material capable of being sintered and with high thermal conductivity is suitable, preferably copper.

A cylindrical object of this type, which could have a completely different shape, is exposed to extensive solar radiation in a solar power unit (not shown) and thus heats to a temperature of more than 800° C. If air is fed through the object 1 in the direction of the arrow from a face 2 to the rear face 3, this air will accordingly heat up to a temperature of more than 800° C., whereby it can then be used to provide energy. A cross-flow system is also possible as shown by the arrows in FIG. 1 passing from one side of the cylindrical surface to the other side. In the same way, other media apart from air may be used for heat removal from object 1.

To reduce the throughput resistance, object 1 can if necessary be fitted with intake holes or channels and with outlet holes or channels, whereby the heat transfer occurs mainly when flowing through the wall sections between the intake and outlet holes or channels.

FIG. 2 shows a heat transfer or heat exchange device, whereby the basic object has single plates 6, each of which is made up of a mesh of several layers of individual wires 7 which are joined to one another as lateral and longitudinal wires of a mesh or fabric, for example. The wires 7 may be of different thickness or the same thickness, as desired. Depending on the application, several plates 6 of this type, with their mesh of metal wires 7, are laid one over the other and are passed between electrode plate 8 and 9 and a resistance welding device.

Figure 4:
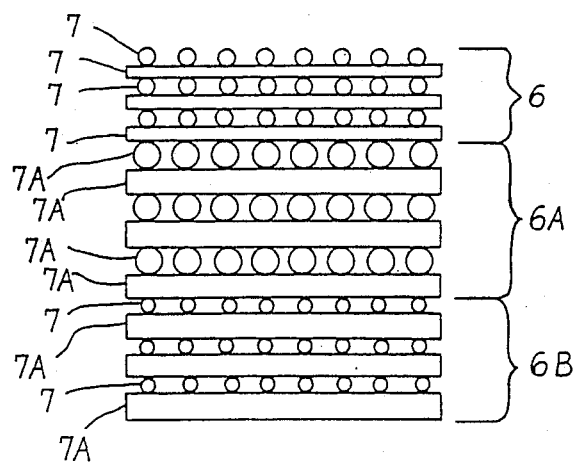
FIG. 4 shows a heat transfer device made of three plates of a mesh of metal wires where the wire thickness is varied.

If the two electrode plates 8 and 9 are moved closer to one another, so that one of the two plates forms a positive pole and the other forms a negative pole, pressure is exerted on the plates 6 between them, and resistance welding is carried out at the same time through a suitable current pulse, then the individual wires 7 will promptly join within plate 6 and the outer wires 7 will also join with the adjacent outer wires 7 in the adjacent next plate 6. This gives a solid unit, whereby there are, however, pores or openings which are large enough to permit the passage of a fluid. The joining of adjacent plates 6, 6A and 6B is shown in FIG. 4, where it can be seen that wires 7 of plate 6 are smaller than the wires 7A of plate 6A, and that plate 6B contains a mixture of both wires 7 and wires 7A.

After resistance welding, the unit thus formed can also be bent to the required shape if necessary.

After resistance welding, the object is coated with shavings, short sections of metal wire or a metal powder 10 made of a thermally conductive material (see FIG. 2). The shavings, wire, or powder may be distributed by any desired method inside the object, such as by shaking, by introduction over a sticky liquid, or by electrical and/or magnetic effect. After the shavings, metal wires or metal powder has been introduced, a sintering process occurs to join the shavings, metal wire sections, and/or powder to the object, i.e., to the wires 7 and the plates 6 which they form.

Figure 3:
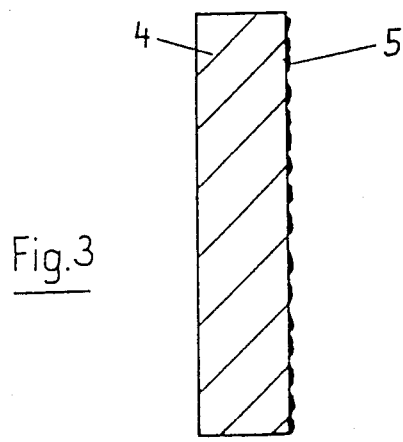
FIG. 3 is a cross-section of an object showing metal particles sintered to it.

FIG. 3 shows a basic diagram of an object 4, one surface of which is coated with metal shavings 5 sintered onto the object 4. The object 4 may be made of any metal suitable for sintering to the metal shavings. Methods for this are known in the art, and therefore are not described in greater detail here.

If heat occurs in the object 4, or if heat is to be fed off through the object 4, which, for example, is used as a container for a medium within it, then the heat dissipation is substantially better due to the greater surface area provided by the sintered metal shavings on the surface of the device 4. In this case, the object 4 could be, for example, a wall of a gearbox, a cylinder head cover for a combustion engine or any other wall through which heat is dissipated.

The diameter of the metal wires or metal powder, or the width of the metal shavings and the length thereof may vary between 0.1 and 5 mm and between 1 and 10 mm respectively, depending on the application. Preferably, the thickness or diameter is between about 0.1 and about 2 mm, and the length is between about 2 and about 5 mm. In general, the length will be significantly greater than the diameter or width. If necessary, however, variations may naturally be made to increase or decrease these.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments and equivalents falling within the scope of the appended claims.

Various features of the invention are set forth in the following claims.

What is claimed:

1. A means for heat transfer comprising an object having a sintered coating, said coating including at least in part a particulate material selected from the group consisting of metal shavings, metal wires and coarse metal powder, said particulate material being thermally conductive particles which are incorporated onto surfaces of the object by sintering; the object comprising one or more plates, with each plate being made of a mesh of several layers of individual wires which are joined to one another by means of resistance welding; and said particulate material having a thickness of from about 0.1 mm to about 5 mm, and a length of from about 1 mm to about 10 mm.

2. The heat transfer means of claim 1 wherein a gaseous medium flows through the object.

3. The heat transfer means of claim 1 wherein said particulate material is sintered to at least a part of the surfaces of the object.

4. The heat transfer means of claim 1 wherein the sintered particles comprise copper.

5. A means for heat transfer comprising an object having a sintered coating, said coating including at least in part a particulate material selected from the group consisting of metal shavings, metal wires and coarse metal powder, said particulate material being thermally conductive particles which are incorporated onto surfaces of the object by sintering; the object comprising one or more plates, with each plate being made of a mesh of several layers of individual wires which are joined to one another by means of resistance welding; and said particulate material having a thickness of from about 0.2 mm to about 2 mm, and a length of from about 2 mm to about 5 mm.

6. The heat transfer means of claim 5, wherein a gaseous medium flows through the object.

7. The heat transfer means of claim 5, wherein said particulate material is sintered to at least a part of the surfaces of the object.

8. The heat transfer means of claim 5 wherein the sintered particles comprise copper.

9. A means for heat transfer comprising an object having a sintered coating, said coating including at least in part, a particulate material selected from the group consisting of metal shavings, metal wires and coarse metal powder, said particulate material being thermally conductive particles which are incorporated onto surfaces of the object by sintering; the object comprising one or more plates, with each plate being made of a mesh of several layers of individual wires which are joined to one another by means of resistance welding; said particulate material having a thickness of from about 0.1 mm to about 5 mm, and a length of from about 1 mm to about 10 mm; and said wires of said plates having different thicknesses.

10. The heat transfer means of claim 9 wherein wires of different thicknesses are used within a plate.

11. The heat transfer means of claim 9 wherein at least one plate has wires of a different thickness compared to the wires of another plate.

12. The heat transfer means of claim 9 wherein said particulate material is sintered to at least a part of the surfaces of the object.

13. A means for heat transfer comprising an object having a sintered coating, said coating including at least in part a particulate material selected from the group consisting of metal shavings, metal wires and coarse metal powder, said particulate material being thermally conductive particles which are incorporated onto surfaces of the object by sintering; the object comprising one or more plates, with each plate being made of a mesh of several layers of individual wires which are joined to one another by means of resistance welding; and said wires of said plates having different thicknesses.

14. The heat transfer means of claim 13 wherein wires of different thicknesses are used within a plate.

15. The heat transfer means of claim 13 wherein at least one plate has wires of a different thickness compared to the wires of another plate.

16. The heat transfer means of claim 13 wherein said particulate material is sintered to at least a part of the surfaces of the object.

* * * * *